(12) United States Patent
Fan

(10) Patent No.: US 6,479,772 B2
(45) Date of Patent: Nov. 12, 2002

(54) SEALING MACHINE HAVING A SAFETY SHUT OFF MECHANISM

(76) Inventor: Jui Chuan Fan, No. 33, Lane 395, Suei Yuan Road, Fong Yuan City, Taichung Hsien (TW), 420

( * ) Notice: Subject to any disclaimer, the term of this patent is extended or adjusted under 35 U.S.C. 154(b) by 0 days.

(21) Appl. No.: 09/832,369

(22) Filed: Apr. 12, 2001

(65) Prior Publication Data

US 2002/0148710 A1 Oct. 17, 2002

(30) Foreign Application Priority Data

Jun. 5, 2000 (TW) .......................... 89209626 U

(51) Int. Cl.⁷ .............................. H01H 3/16; F16P 3/12; H02H 1/00
(52) U.S. Cl. ................................ 200/61.62; 192/129 A; 192/133; 200/61.7; 307/326
(58) Field of Search .............................. 192/116.5–150; 200/81.9 R, 81.9 M, 81.9 HG, 52 R, 61.62, 61.7; 307/326

(56) References Cited

U.S. PATENT DOCUMENTS

| | | | |
|---|---|---|---|
| 3,875,356 A | * 4/1975 | Heim et al. | ............ 200/61.7 X |
| 4,764,835 A | * 8/1988 | Bowman | .................... 192/133 |
| 4,788,534 A | * 11/1988 | Engelhardt | ............ 200/81.9 M |
| 5,434,457 A | * 7/1995 | Josephs et al. | ............. 307/326 |
| 5,690,206 A | * 11/1997 | Carroll, Jr. et al. | ......... 192/136 |

* cited by examiner

Primary Examiner—J. R. Scott
(74) Attorney, Agent, or Firm—Charles E. Baxley

(57) ABSTRACT

A safety shut off mechanism for a sealing machine includes a housing having a front board, and a door panel rotatably secured to the front board and rotatable between an outward position, an inner position, and an intermediate position. A switch member may be attached to either the board or the door panel and may be actuated when the door panel is disengaged from the intermediate position or moved inward or outward toward the outward position or the inner position, so as to shut off the sealing machine when the door panel is not in the intermediate position.

6 Claims, 16 Drawing Sheets

US 6,479,772 B2

SEALING MACHINE HAVING A SAFETY SHUT OFF MECHANISM

BACKGROUND OF THE INVENTION

1. Field of the Invention

The present invention relates to a sealing machine, and more particularly to a sealing machine including a safety shut off mechanism to shut off the sealing machine when required.

2. Description of the Prior Art

Illustrated in FIGS. 1 and 2 is a typical sealing machine 10 including a housing 11, a door panel 14 having an upper portion rotatably or pivotally secured to the inner portion of the housing 11 with a pivot axle 13, such that the door panel 14 may be rotated inward of the housing 11 only. The door panel 14 includes an actuating member 18 attached to the rear portion thereof for engaging with a switch 17, such as a micro-switch 17 in order to shut off the sealing machine when the door panel 14 is rotated and moved inward of the housing 11 by the user or when the hand of the user is engaged into the housing 11. The sealing machine includes a seat or a table 12 provided on the bottom portion thereof for supporting a cup 15 or the like that is to be sealed with a sealing membrane of the sealing machine. The door panel 14 may not be rotated outward of the housing such that the door panel 14 has to be disengaged from the housing 11 when the object or the cup 15 may not be removed out of the housing 11.

The present invention has arisen to mitigate and/or obviate the afore-described disadvantages of the conventional sealing machines.

SUMMARY OF THE INVENTION

The primary objective of the present invention is to provide a sealing machine including a safety shut off mechanism to shut off the sealing machine when required, particularly when a hand is engaged into the sealing machine or when the door of the sealing machine is opened outward.

In accordance with one aspect of the invention, there is provided a safety shut off mechanism for a sealing machine, the safety shut off mechanism comprising a housing including a front board, a door panel rotatably secured to the front board and rotatable between an outward position, an inner position, and an intermediate position, a switch member, and means for actuating the switch member when the door panel is disengaged from the intermediate position.

The front board includes two side bars each having a lower portion extended downward therefrom, the door panel includes two side plates having an upper portion rotatably secured to the lower portions of the side bars of the front board.

The switch member is secured to the front board, the actuating means includes an actuator member secured to the door panel for engaging with the switch member when the door panel is disengaged from the intermediate position and moved inward or outward toward the outward position or the inner position.

The switch member includes a depression button, the actuator member includes two cusps for engaging with and for actuating the switch member, and includes a depression formed between the cusps for receiving the depression button.

A bracket may further be provided and secured to the front board, the switch member is secured to the bracket for securing to the front board.

A spring biasing device or a recovering device may further be provided for recovering the door panel to the intermediate position, and includes a pivot pin for pivotally securing the door panel to the front board, a spring member engaged on the pivot pin and having two legs engaged with the door panel and the front board for biasing the door panel to the intermediate position.

Further objectives and advantages of the present invention will become apparent from a careful reading of a detailed description provided hereinbelow, with appropriate reference to accompanying drawings.

DETAILED DESCRIPTION OF THE PREFERRED EMBODIMENT

Figure 1:
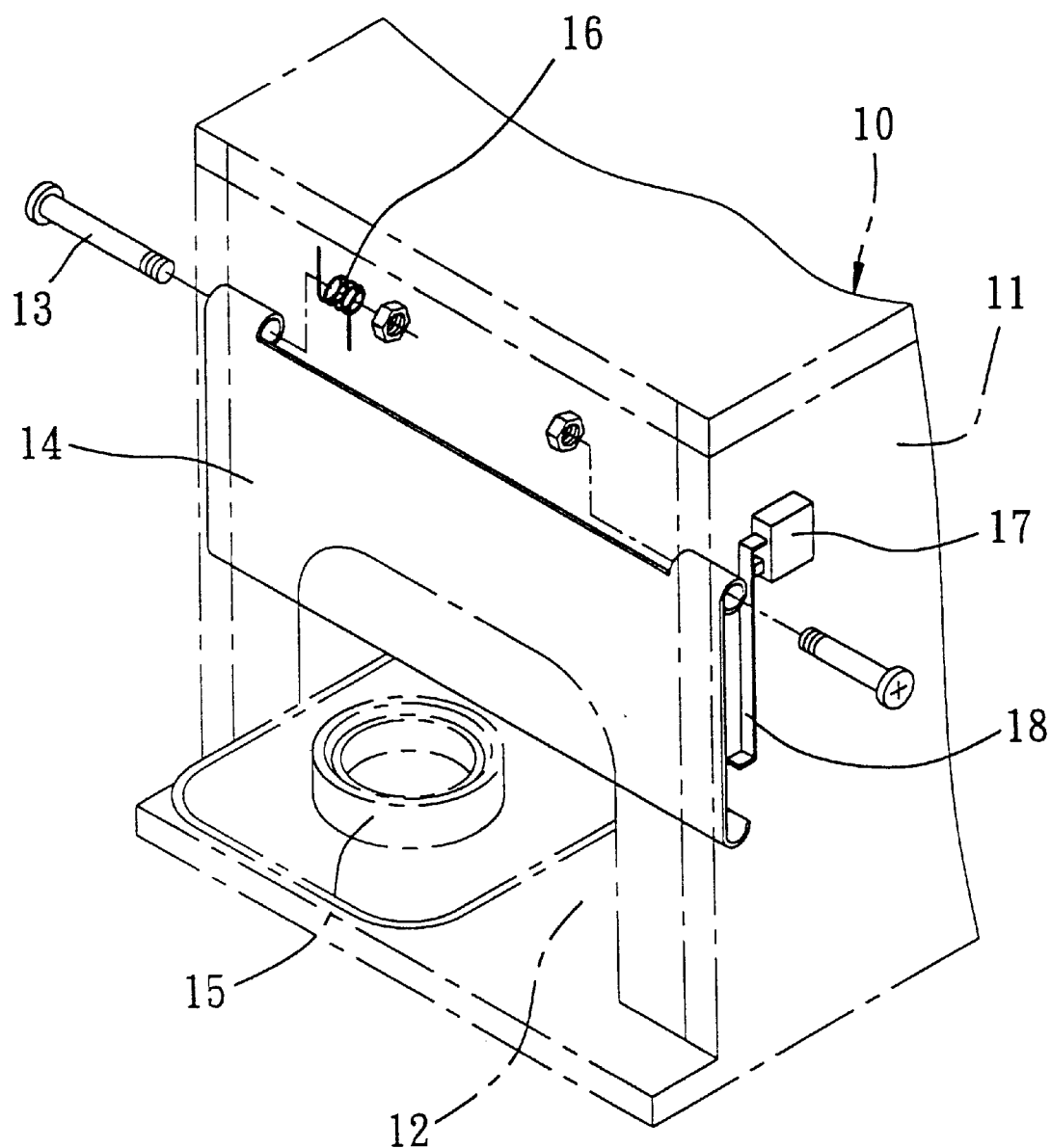
FIG. 1 is a partial perspective view illustrating a typical sealing machine.
Figure 2:
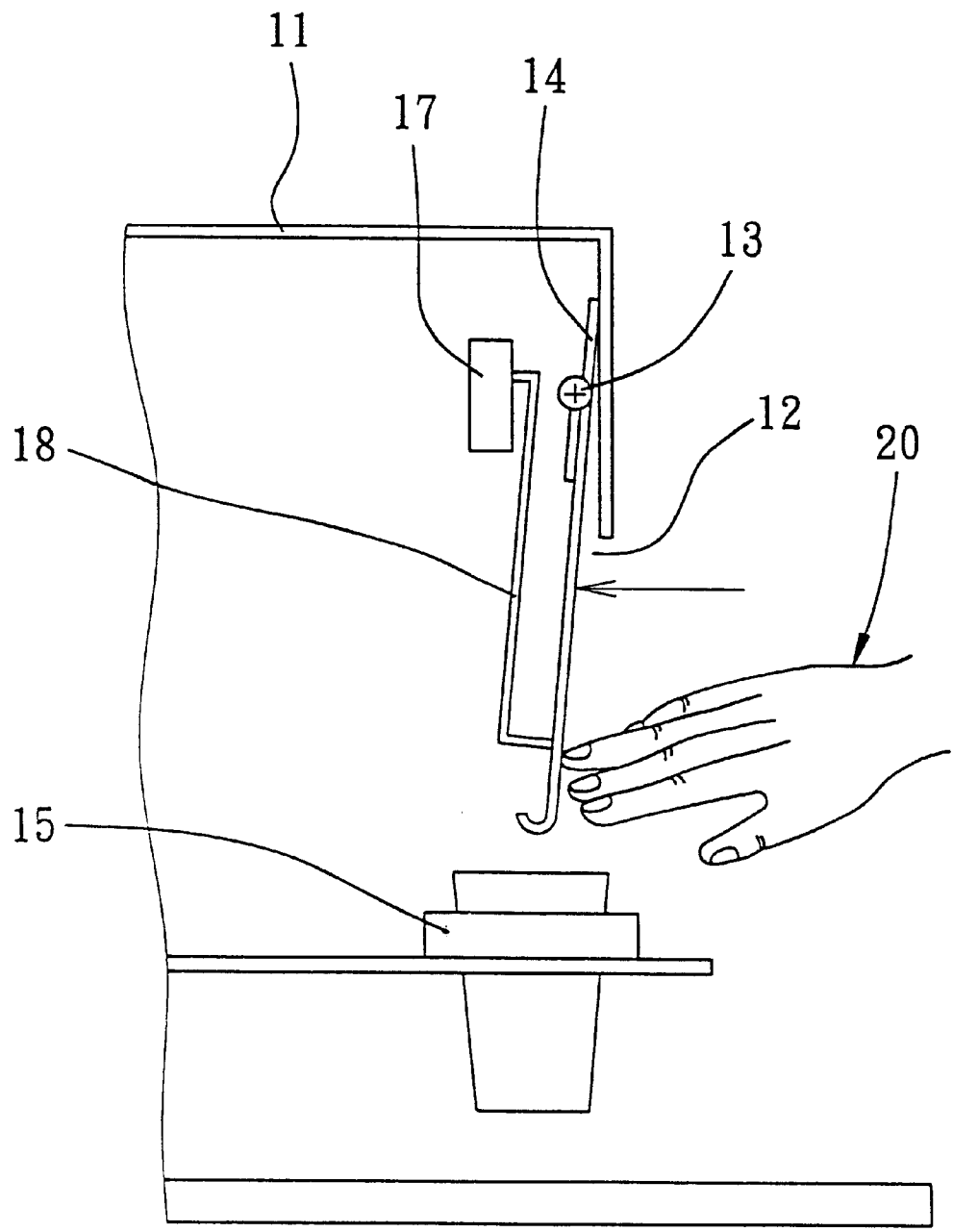
FIG. 2 is a partial side schematic view illustrating operation of the typical sealing machine having a safety mechanism.
Figure 3:
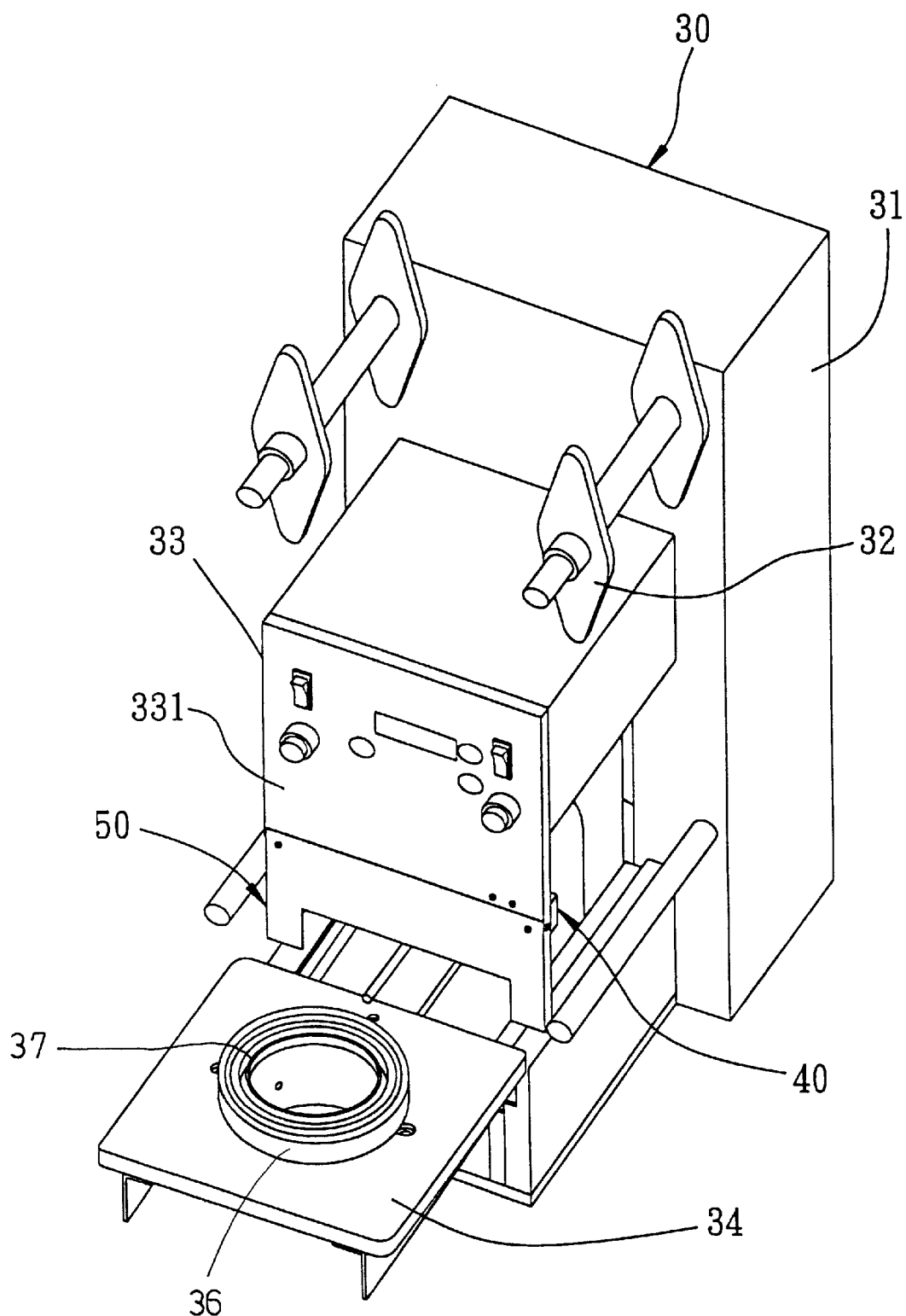
FIG. 3 is a perspective view of a sealing machine having a safety shut off mechanism in accordance with the present invention.
Figure 4:
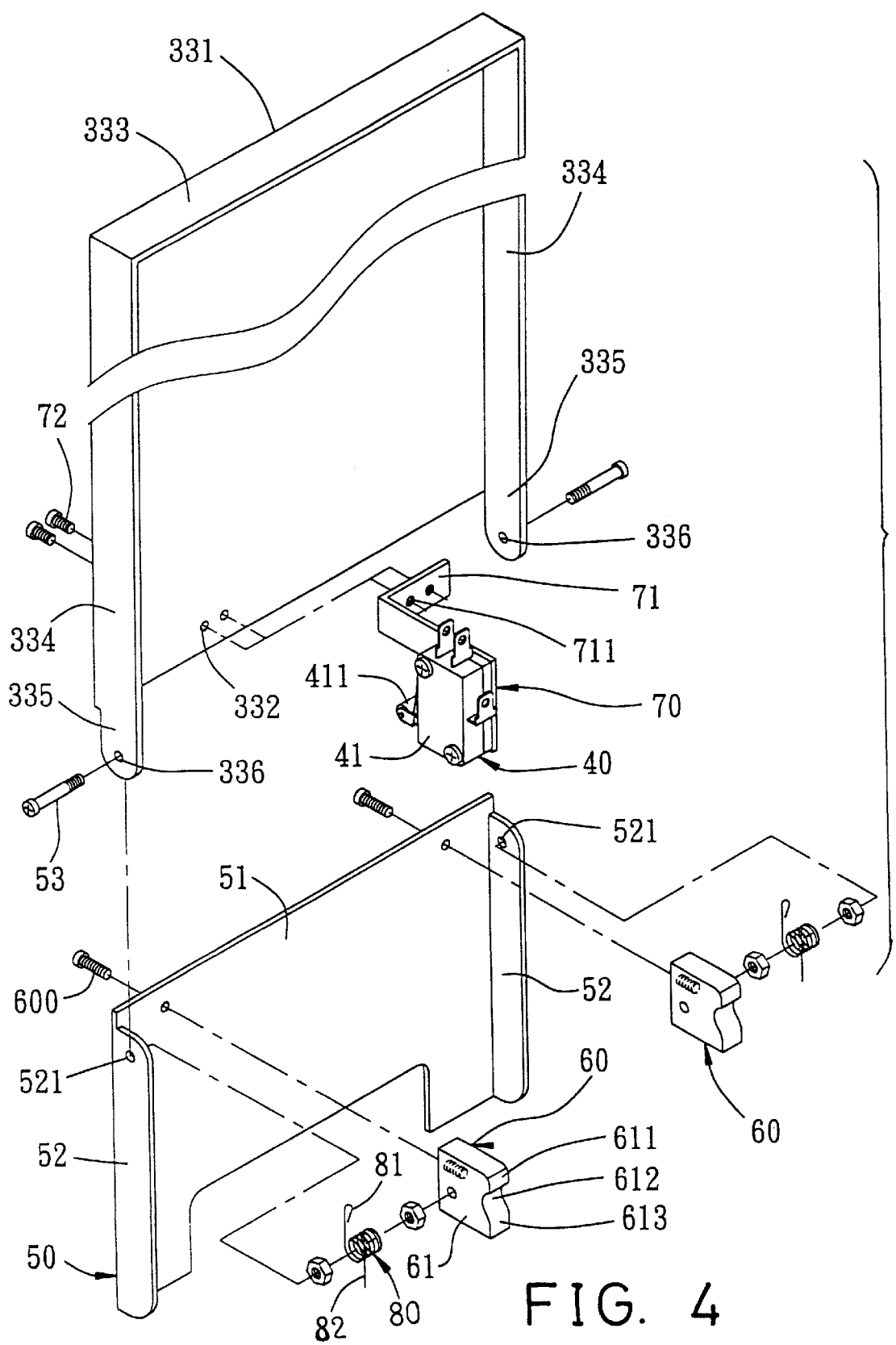
FIG. 4 is a partial exploded view of the sealing machine.

Referring to the drawings, and initially to FIG. 3, a sealing machine 30 in accordance with the present invention comprises a machine body 31 including a sealing membrane support 32 provided on the upper portion thereof, a housing 33 disposed or provided in front of the machine body 31, and a seat or a table 34 slidably received in the lower portion of the housing 33 and/or of the machine body 31 and movable inward of the lower portion of the housing 33. The table 34 includes a support 36 provided thereon for supporting the cup 37 or the like to be sealed with a sealing membrane that may be supported on the sealing membrane support 32. The attachment of the sealing membrane onto the cup 37 or the like is not related to the present invention and will not be described in further details.

Referring next to FIGS. 3–7, the sealing machine 30 includes a control panel or a front board 331 disposed or provided on the front portion of the housing 33. The front board 331 includes an upper bar 333 and two side bars 334 extended rearwardly therefrom. The side bars 334 each includes a lower end 335 having a hole 336 formed therein for receiving a fastener or a pivot pin 53 therein. A door panel 50 includes a front plate 51 and two side plates 52 extended rearwardly from the front plate 51. The side plates 52 each includes an upper portion having a hole 521 formed therein for receiving the fastener or the pivot pin 53 therein, such that the door panel 50 may be rotatably or pivotally secured to the lower portion of the front board 331 with the pivot pins 53.

A bracket 70 includes an arm 71 having one or more holes 711 formed therein for receiving or for engaging with fasteners 72 which are engaged through the holes 332 of the front board 331 and which may secure the bracket 70 to the inner portion of the front board 331. A switch device 40 includes a switch member 41 secured to the bracket 70 by such as the fasteners. The switch member 41 includes a depression button 411 provided thereon for being depressed and actuated by the other object.

Figure 5:
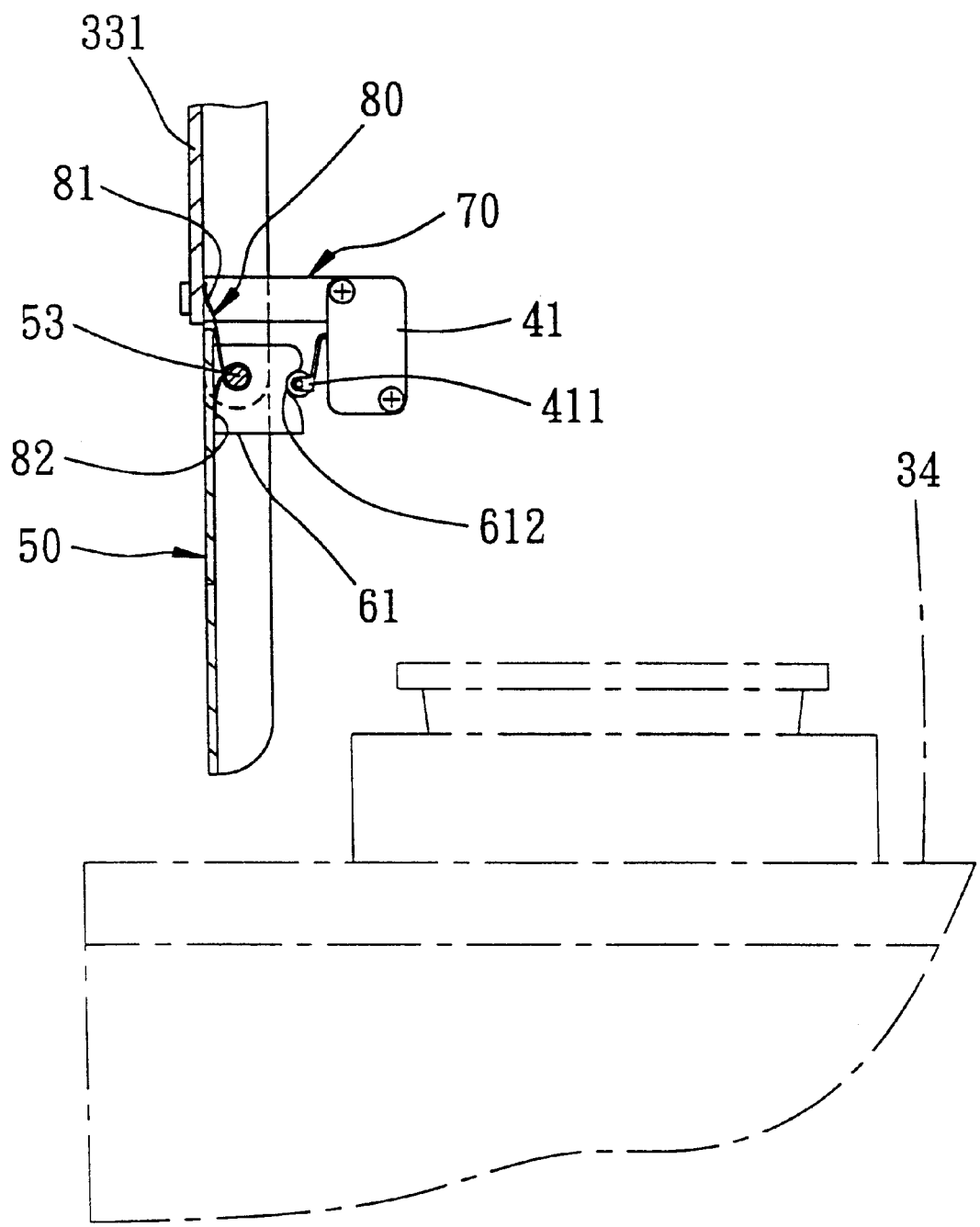
FIGS. 5, 6, 7 are partial cross sectional views illustrating the operation of the safety shut off mechanism for the sealing machine.
Figure 6:
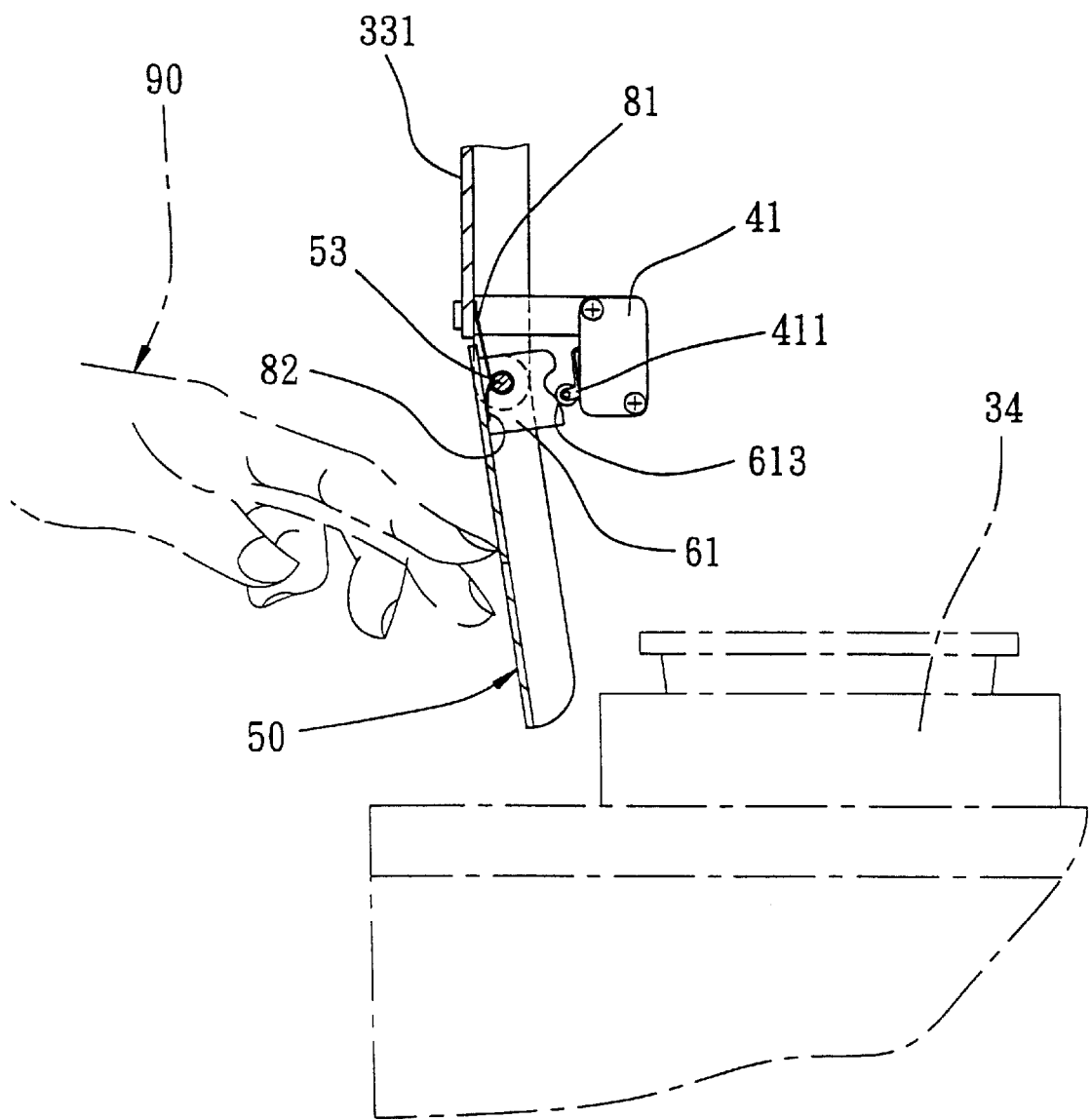
Figure 7:
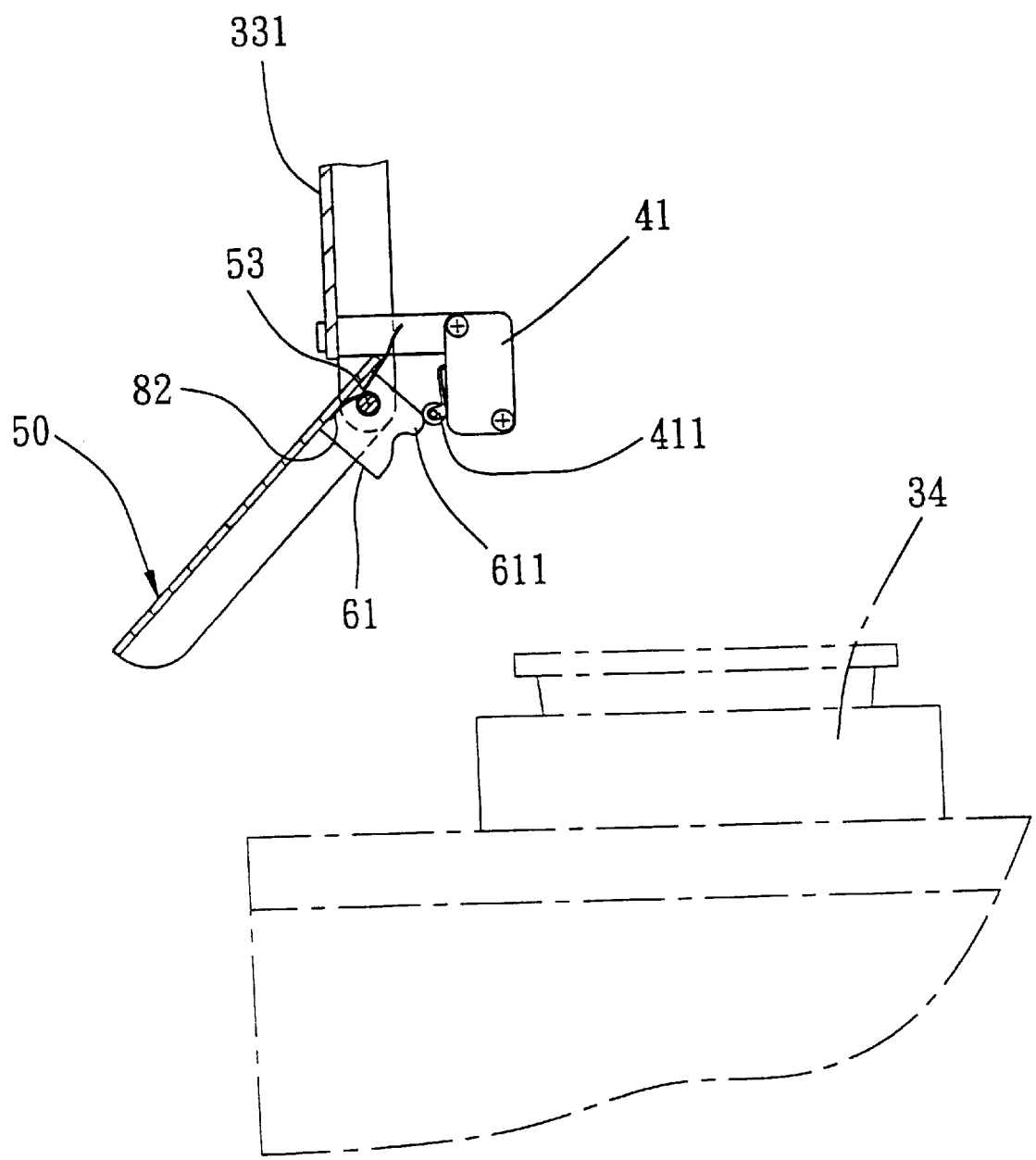
Figure 8:
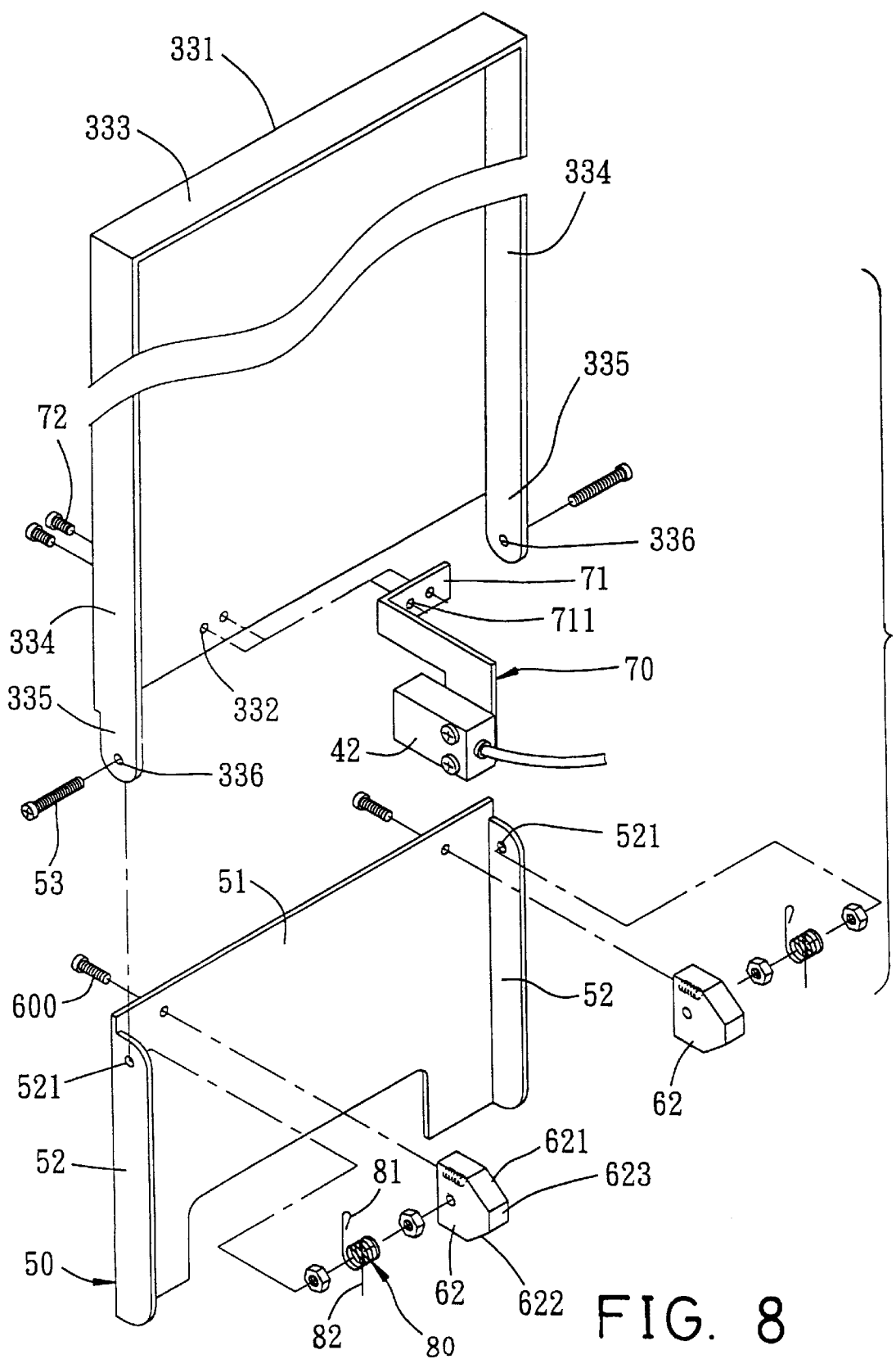
FIG. 8 is a partial exploded view illustrating the other embodiment of the safety shut off mechanism for the sealing machine.

One or more actuator members 60 are secured to the side plates 52 of the door panel 50 with the fasteners or the pivot pins 53 and/or secured to the front plate 51 of the door panel 50 with one or more fasteners 600. A spring member 80 is engaged on one of the pivot pins 53 and includes two legs 81, 82 engaged with the front board 331 and the door panel 50 for recovering the door panel 50 to the intermediate position or the downward dependent position as shown in FIG. 5, after the door panel 50 is moved or rotated inward of the housing 33 (FIG. 6) or rotated outward of the housing 33 (FIG. 7). The actuator member 60 includes an actuator body 61 having a depression 612 and two cusps or bulges 611, 613 formed in the rear portion thereof, in which the depression 612 of the actuator body 61 is formed or defined between the bulges 611, 613.

In operation, as shown in FIG. 5, the depression button 411 of the switch member 41 is received in the depression 612 of the actuator body 61 when the door panel 50 is rotated to or located at the downward dependent position, such that the switch member 41 may be switched on or switched off for allowing the sealing machine to be operated or actuated to conduct the sealing operations. As shown in FIGS. 6 and 7, when the door panel 50 is moved or rotated inward or outward of the housing 33, the depression button 411 of the switch member 41 may be depressed or actuated by the bulges 611, 613 of the actuator body 61, such that the sealing machine may be stopped or may be shut off when the door panel 50 is either moved or rotated inward or outward of the housing 33. For example, as shown in FIG. 6, when the hand of the user or of the children is engaged into the housing 33, the door panel 50 may be moved or rotated inward of the housing 33, and the switch member 41 may be actuated to stop or to shut off the sealing machine, such that the hands of the users may be prevented from being damaged by the sealing machine inadvertently.

Figure 9:
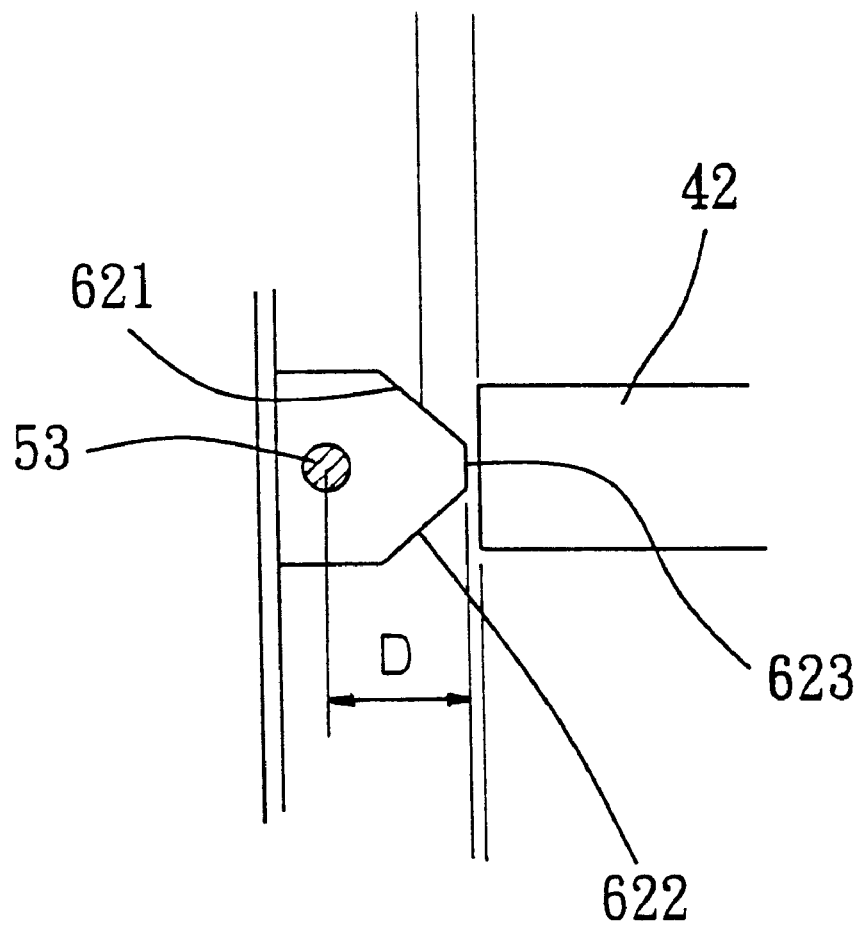
FIG. 9 is a partial plane schematic view showing the actuator of the safety shut off mechanism for the sealing machine as shown in FIG. 8.
Figure 10:
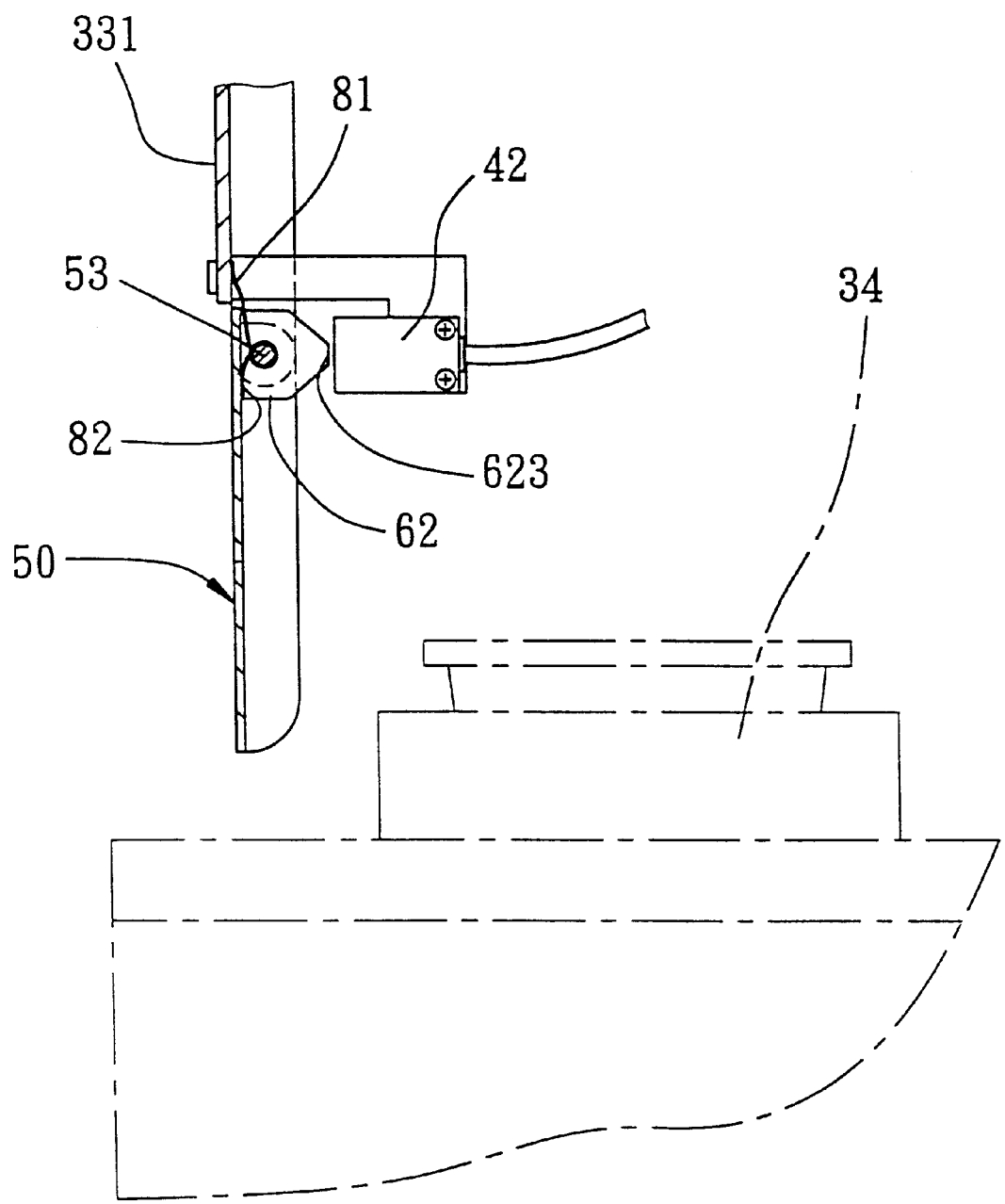
FIGS. 10, 11, 12 are partial cross sectional views illustrating the operation of the safety shut off mechanism for the sealing machine as shown in FIG. 8.

Referring next to FIGS. 8–12, illustrated is the other embodiment of the safety shut off mechanism for the sealing machine which includes an induction type switch member 42. The actuator member 62 may include a cusp 623 formed in the middle portion and two cut-off portions or two inclined surfaces 621, 622 formed in the upper and the rear portion of the cusp 623 of the actuator member 62. As shown in FIG. 9, the distance "D" between the tip of the cusp 623 and the pivot pin 53 is greater than the distance between the inclined surface(s) 621, 622 and the pivot pin 53. In operation, as shown in FIG. 10, when the door panel 50 is located in the downward dependent position, the cusp 623 faces toward the switch member 42 such that the switch member 42 may be switched off and such that the sealing machine is allowed to be operated or actuated to conduct the sealing operations.

Figure 11:
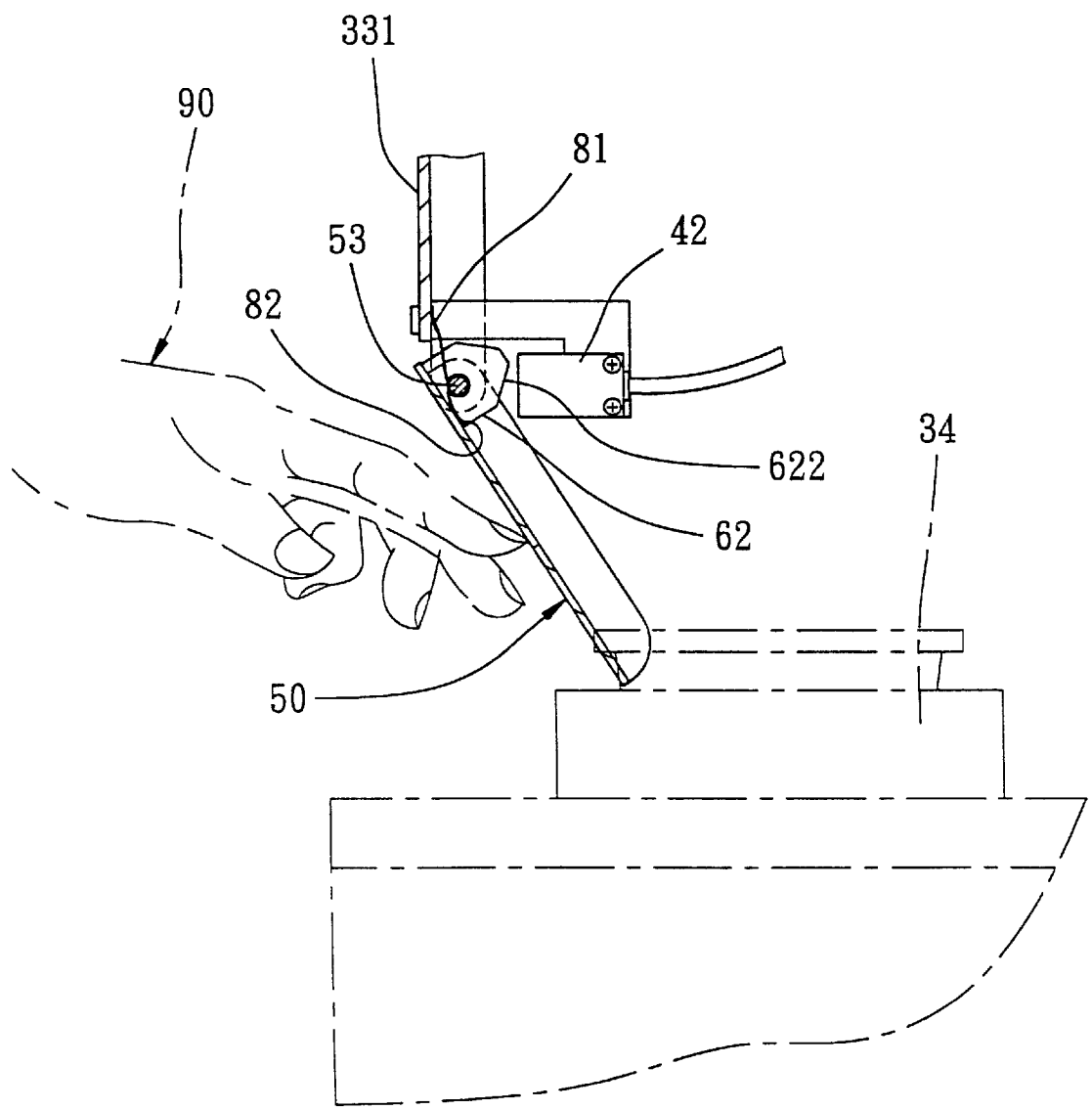
Figure 12:
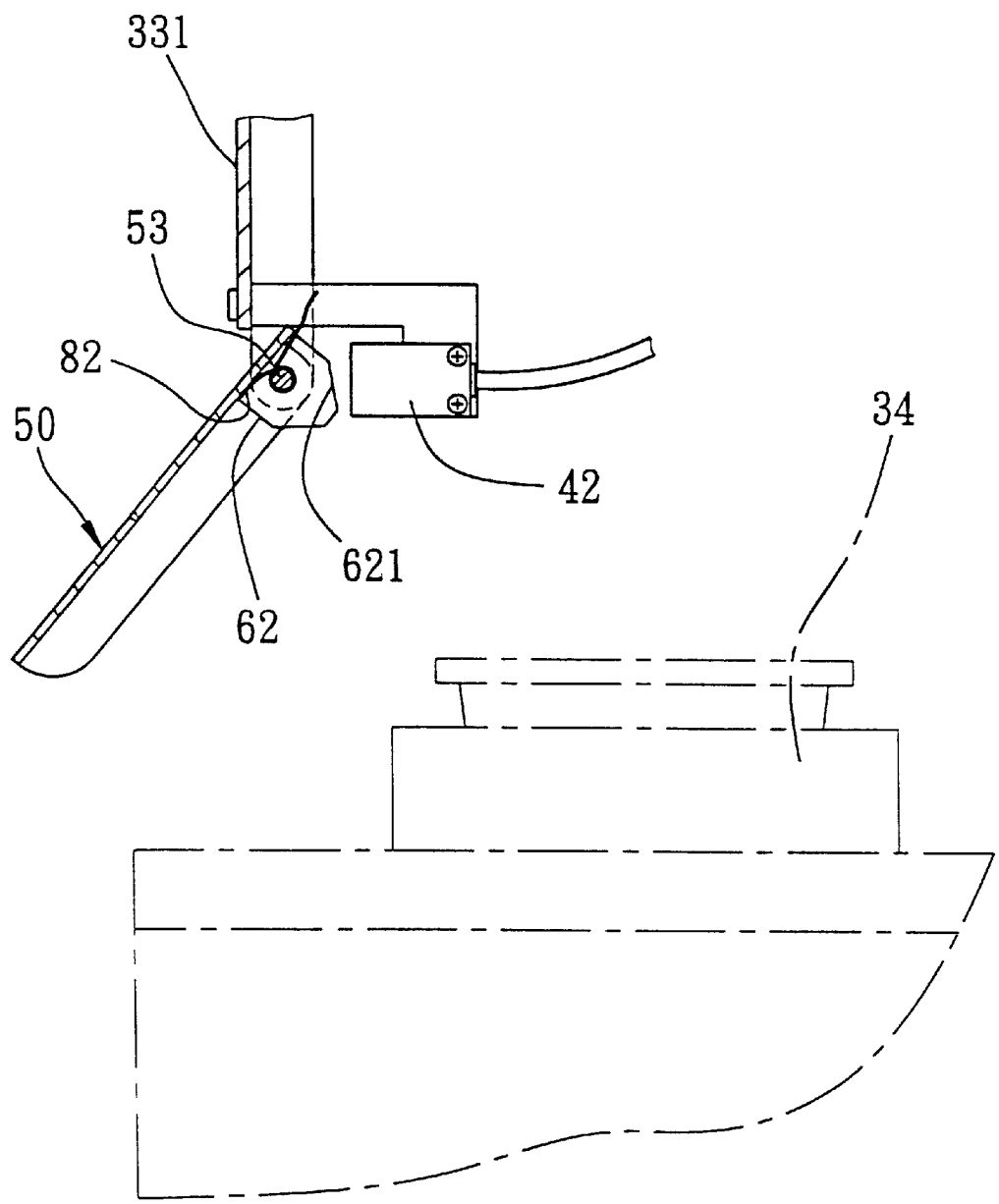
Figure 13:
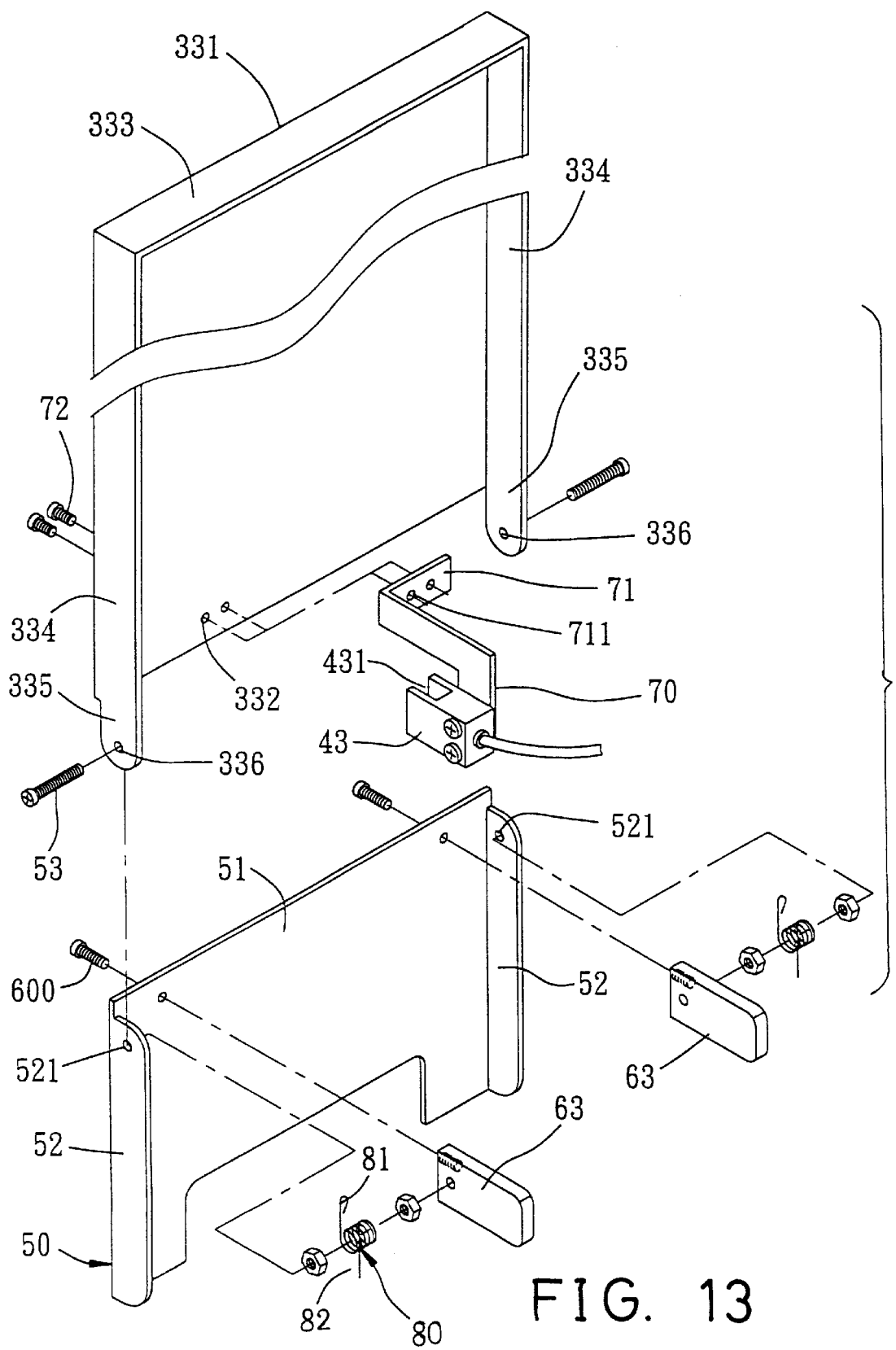
FIG. 13 is a partial exploded view illustrating the further embodiment of the safety shut off mechanism for the sealing machine.
Figure 14:
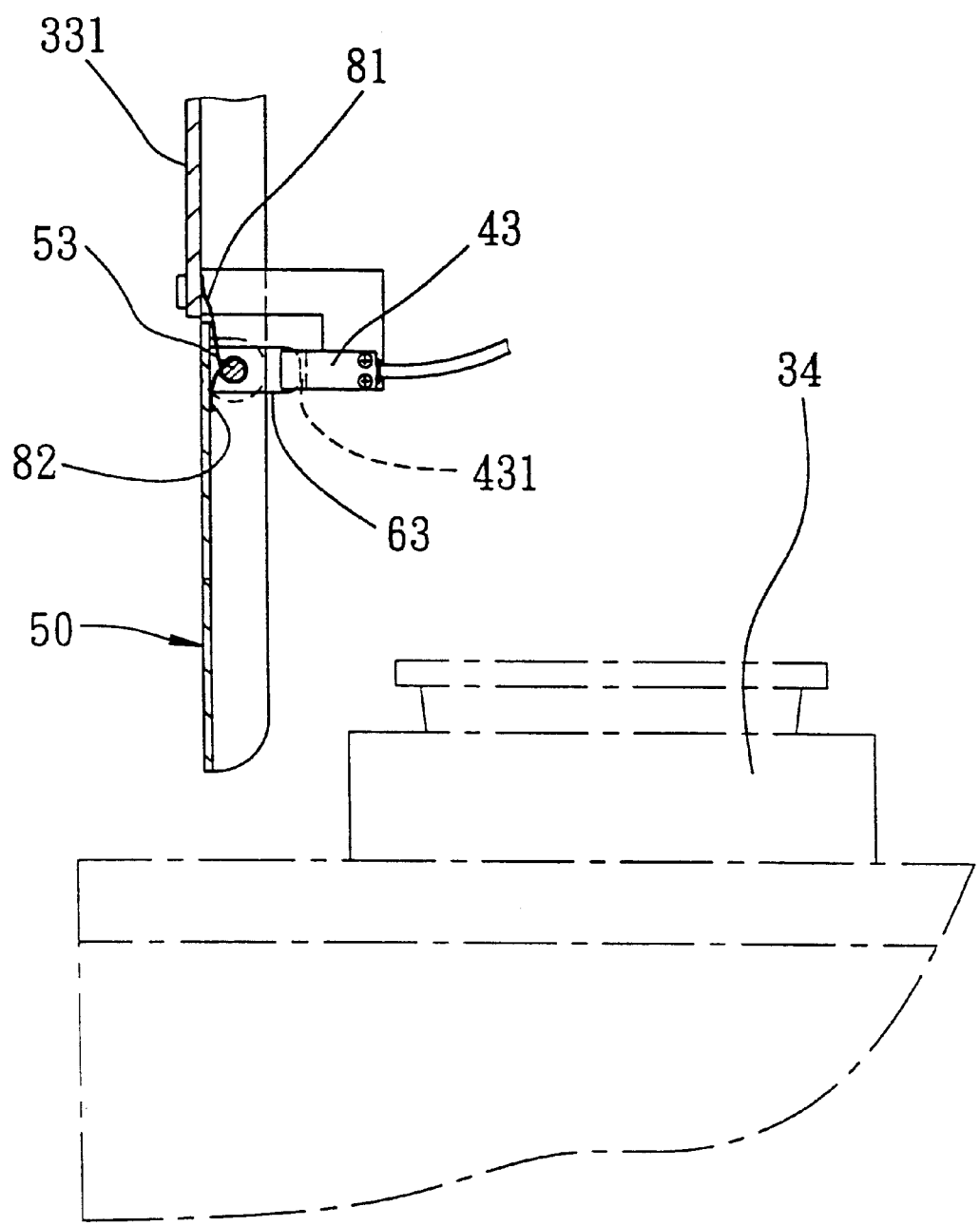
FIGS. 14, 15, 16 are partial cross sectional views illustrating the operation of the safety shut off mechanism for the sealing machine as shown in FIG. 13.

As shown in FIGS. 11, 12, when the door panel 50 is moved or rotated inward or outward of the housing 33, the cusp 623 may be disengaged or moved away from the switch member 42 and the inclined surfaces 621, 622 may be moved or faced toward the switch member 42, such that the switch member 42 may be switched off in order to stop or to shut off the sealing machine when the door panel 50 is either moved or rotated inward or outward of the housing 33.

Figure 15:
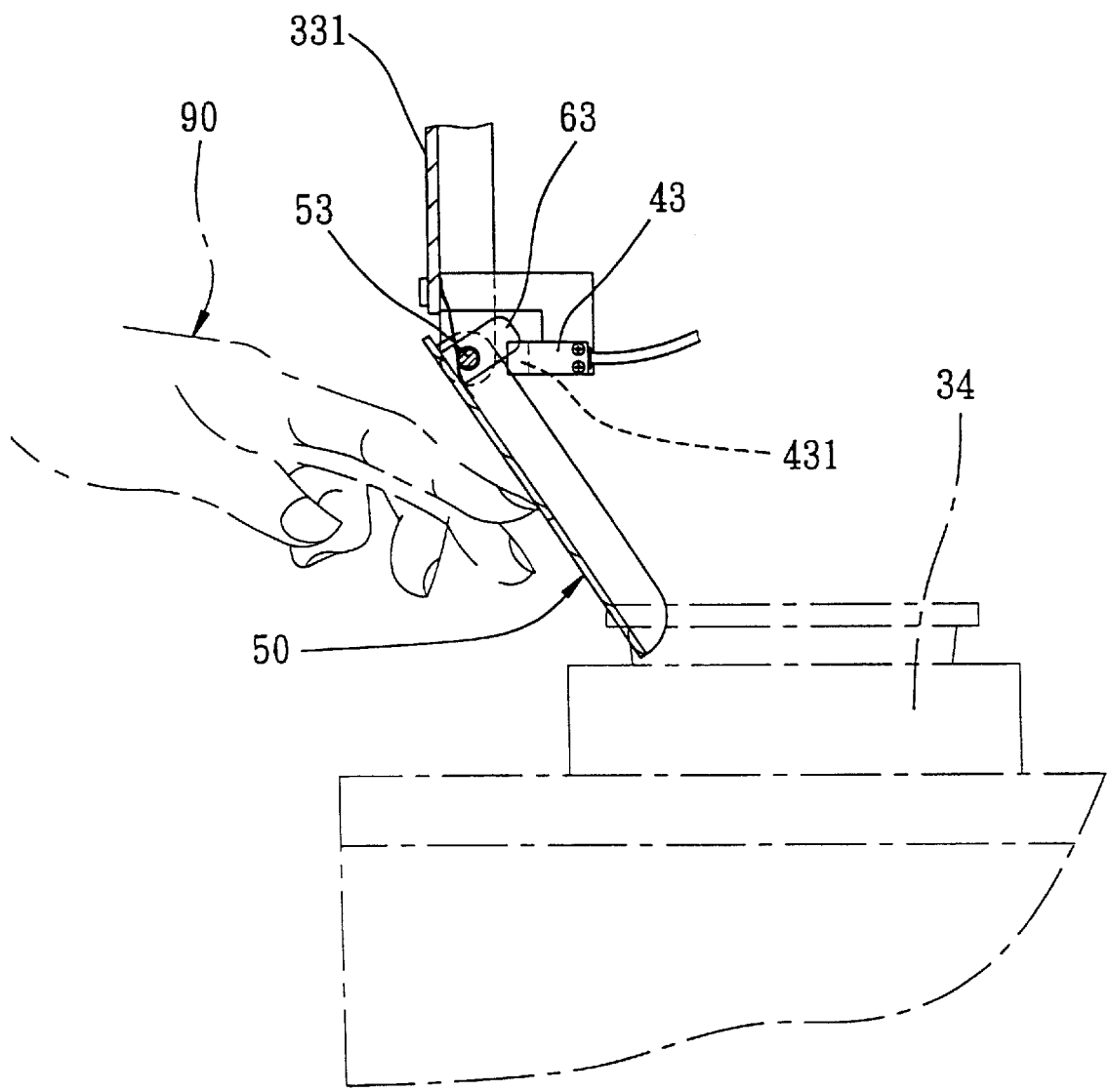
Figure 16:
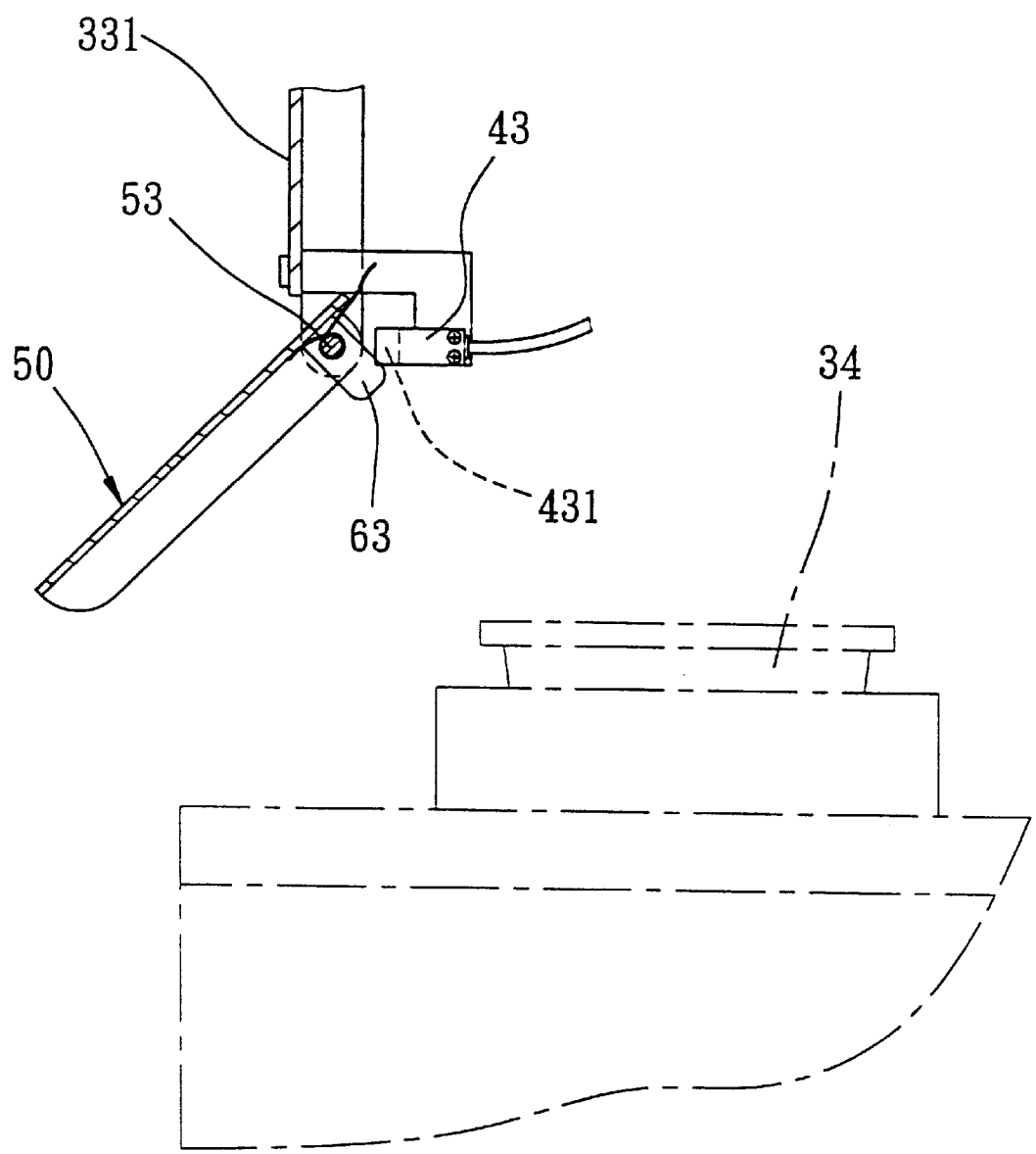

Referring next to FIGS. 13–16, illustrated is the further embodiment of the safety shut off mechanism for the sealing machine which includes a photo-switch 43 having a notch 431 formed therein. The actuator member 63 may be engaged into the notch 431 of the photo-switch 43 (FIG. 14) in order to switch off the photo-switch 43, such that the sealing machine is allowed to be operated or actuated to conduct the sealing operations. As shown in FIGS. 15, 16, when the door panel 50 is moved or rotated inward or outward of the housing 33, the actuator member 63 may be disengaged or partially moved away from the notch 43 of the switch member 43, such that the switch member 43 may be switched off in order to stop or to shut off the sealing machine when the door panel 50 is either moved or rotated inward or outward of the housing 33.

Accordingly, the sealing machine in accordance with the present invention includes a safety shut off mechanism to shut off the sealing machine when required, particularly when a hand is engaged into the sealing machine or when the door of the sealing machine is opened outward.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A safety shut off mechanism for a sealing machine, said safety shut off mechanism comprising:

a housing including a front board, a door panel rotatably secured to said front board and rotatable between an outward position, an inner position, and an intermediate position, a switch member secured to said front board of said housing, and means for actuating said switch member when said door panel is disengaged from said intermediate position, said actuating means including an actuator member secured to said door panel for engaging with said switch member when said door panel is disengaged from said intermediate position and moved inward or outward toward said outward position or said inner position.

2. The safety shut off mechanism according to claim 1, wherein said front board includes two side bars each having a lower portion extended downward therefrom, said door panel includes two side plates each having an upper portion rotatably secured to said lower portions of said side bars of said front board respectively.

3. The safety shut off mechanism according to claim 1, wherein said switch member includes a depression button, said actuator member includes two cusps for engaging with and for actuating said switch member, and includes a depression formed between said cusps for receiving said depression button.

4. The safety shut off mechanism according to claim 1 further comprising a bracket secured to said front board, said switch member is secured to said bracket.

5. The safety shut off mechanism according to claim 1 further comprising means for recovering said door panel to said intermediate position.

6. The safety shut off mechanism according to claim 5, wherein said recovering means includes a pivot pin for pivotally securing said door panel to said front board, a spring member engaged on said pivot pin and having two legs engaged with said door panel and said front board for biasing said door panel to said intermediate position.

\* \* \* \* \*